US006073441A

United States Patent [19]

Harju

[11] Patent Number: 6,073,441

[45] Date of Patent: Jun. 13, 2000

[54] SINGLE ACTING PNEUMATIC PISTON-CYLINDER UNIT

[75] Inventor: Bert Harju, Harads, Sweden

[73] Assignee: Pos-Line AB, Harads, Sweden

[21] Appl. No.: 09/142,318

[22] PCT Filed: Feb. 28, 1997

[86] PCT No.: PCT/SE97/00349

§ 371 Date: Sep. 4, 1998

§ 102(e) Date: Sep. 4, 1998

[87] PCT Pub. No.: WO97/33093

PCT Pub. Date: Sep. 12, 1997

[30] Foreign Application Priority Data

Mar. 6, 1996 [SE] Sweden .................................. 9600875

[51] Int. Cl.[7] ...................................................... F16D 31/02

[52] U.S. Cl. ................................ 60/414; 60/416; 60/417; 91/395; 91/420

[58] Field of Search ............................ 60/414, 416, 417, 60/461; 91/395, 399, 420

[56] References Cited

U.S. PATENT DOCUMENTS

| | | | |
|---|---|---|---|
| 2,703,558 | 3/1955 | Wilcox . | |
| 3,410,180 | 11/1968 | Spangler et al. . | |
| 3,552,274 | 1/1971 | Bojan . | |
| 3,645,170 | 2/1972 | Varouxis . | |
| 3,901,130 | 8/1975 | Lange | 91/461 |
| 4,706,781 | 11/1987 | Ikimi et al. | 187/9 E |

FOREIGN PATENT DOCUMENTS

| | | |
|---|---|---|
| 392 674 | 5/1991 | Austria . |

*Primary Examiner*—F. Daniel Lopez
*Assistant Examiner*—Thomas E. Lazo
*Attorney, Agent, or Firm*—Larson & Taylor plc

[57] ABSTRACT

A pneumatic piston-cylinder apparatus of single acting type which performs a working stroke in one working direction, and is returned to its initial position without any external supply of compressed air comprising a cylinder part with cylinder jacket (1), a front end (2), a rear end (3), and a piston (5) which is reciprocatable in the cylinder. Connected to the rear end (3) is a supply of compressed air and within the cylinder is a return channel (10) used for draining the air on the unloading side of the piston. Also, an upper channel (9), return air chamber (26), a second pressure channel (29) and compressed air chamber (30, are provided to build up a reserve amount of compressed air at the unloading side of the piston at the end of the working stroke through the action of a valve rod (27) connected to the piston (5) with a tubular valve slide (32) actuated by a spring (33) close to the end of the working stroke whereby channels (35,36) are opened between pressure chamber (23) and the reserve chambers to return the piston (5) to its initial position for the working stroke.

6 Claims, 2 Drawing Sheets

SINGLE ACTING PNEUMATIC PISTON-CYLINDER UNIT

The present invention generally relates to a piston-cylinder unit of single acting type, whereby is means a piston-cylinder unit which performs an operative (working) stroke in one direction (working direction) and which is returned to its initial position by a minimum of force.

A previously suggested type of such "pneumatic cylinder" is formed so that the pressure side of the piston receives compressed air of high pressure along the entire working stroke, whereas the unloading (inactive) side of the piston receives very little pressure over the greatest part of the working stroke, but so that said unloading side of the piston is supplied with the same pressure as that of the pressure side a slight distance from the end of the working stroke. When the pressure at the working side of the piston is thereafter drained there is a pressure remained at the unloading side of the piston, and said pressure is used for returning the piston to its initial position for the working stroke, whereby the pressure side of the cylinder is drained, so that the piston can be returned only by means of the power from the return-compressed air. This way of operating a pneumatic cylinder involves a great saving of compressed air. An example of said previously suggested type of pneumatic "saving cylinder" is shown in the Swedish patent No 9401187-1 (corresponding to PCT/SE95/01115).

In some cases it is, however, desired that the piston operates with full pressure over its entire, or at least almost its entire working stroke, and that the unloading side of the cylinder is thereby drained of compressed air during practically the entire working stroke. It is also often desired that the cylinder is formed so that there is a connection means for compressed air only at one end of the cylinder, especially close to the end of the pressure side thereof.

There may appear problems to build up a return-air-pressure in the unloading volume of the cylinder at the same time as the piston is allowed to operate at full pressure over the entire working stroke. It is also important that the apparatus is formed so that the piston does not hit the end of the cylinder with a strong force at the moment of reversing movement, and this happens if the piston rams into the front end of the cylinder with full force.

The invention therefore intends to provide a single acting pneumatic piston-cylinder unit which is designed so that the piston is loaded with full working pressure over the entire working stroke thereof, and so that the unloading space of the cylinder in drained over the entire, or almost the entire working movement of the piston. Return air pressure is created, in a secondary stage of the piston movement, when the entire working stroke has come to an end, in one or more compressed air tanks arranged inside the cylinder. To that end, and to prevent the piston from strongly hitting the front cylinder end, at least during its working stroke, the piston and the cylinder is formed with co-operating means for providing a dampening of the final movement of the piston.

Further, according to the invention the piston of the piston-cylinder apparatus is formed with a valve apparatus for letting a slight amount of air of full pressure into one or more of compressed air tanks of the cylinder at said secondary stage. Said slight amount of compressed air is utilized to return the piston to its initial position of the working stroke. It is important that the valve is kept closed during the entire working stroke of the piston, so that compressed air is transferred to the return chamber thereby reducing the total pressure and the movement of the piston.

Further characteristics and advantages of the invention will be evident from the following detailed specification in which reference will be made to the accompanying drawings, in which FIG. 1 is an axial cross section view through an embodiment illustrating an example of a piston-cylinder apparatus according to the invention during its working stroke.

Figure 4:
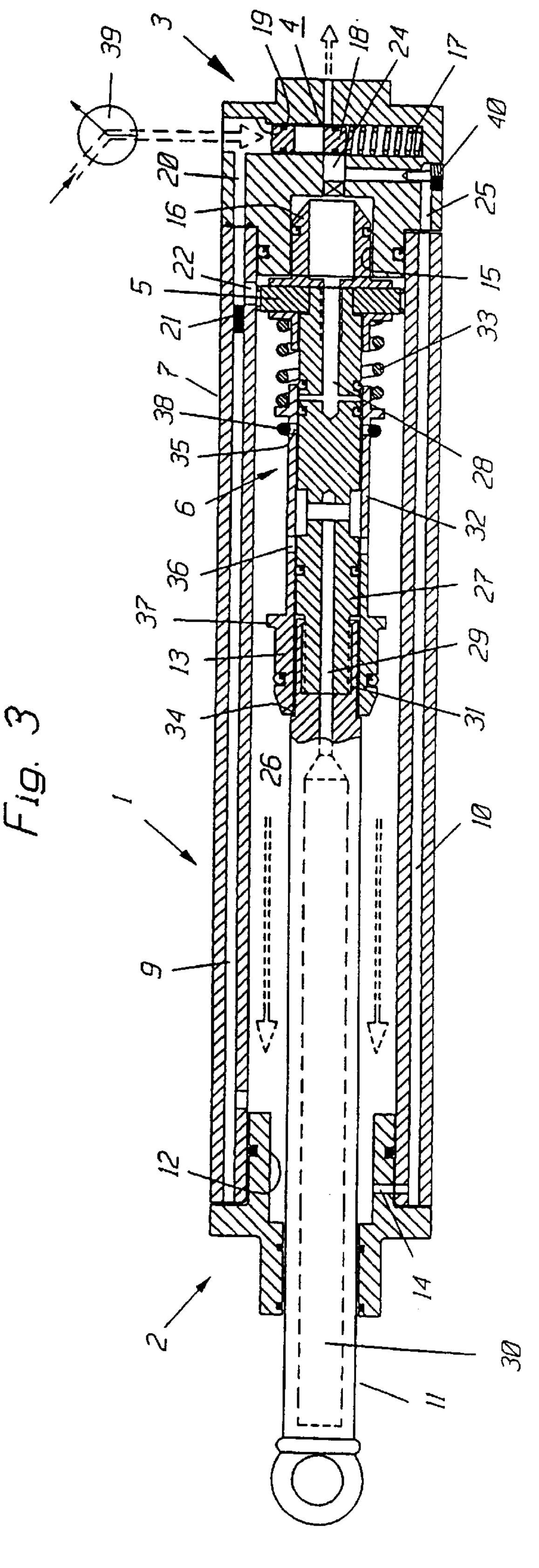

FIG. 4 similarly shows the apparatus at the moment when the return stroke has just come to an end and a new cycle including a working stroke and a return stroke is to be commenced.

The piston-cylinder apparatus shown in the drawings generally comprises a cylinder jacket 1 having a front end 2 and a rear end 3 with an draining valve 4 mounted at said rear end, and further having a working piston 5 and a return air valve 6 connected thereto.

The cylinder jacket 1 is of the type known per se which has a star shaped cross section view and in which each star arm 7 has an axial through channel. In the illustrated case mounting screws 8 are arranged in four of the star arms. Of the remaining channels two opposite channels are used as compressed air channels, one of said channels used as a compressed air chamber 9 and the second one of said channels used as a return air channel 10. The remaining channels may be used for housing of for instance electric conduits.

The front end 2 is formed as a guide for the piston rod 11 which extends through the said front end 2. Interiorly the front end is formed with a cup-shaped recess intended fo form a front dampening chamber 12 for a front dampening piston 13 connected to the operative (working) piston 5. From said front dampening chamber 12 a narrow channel 14 leads into the return air channel 10 of the cylinder jacket. The front end also has a shoulder with a sealing ring on which the cylinder jacket 1 is mounted.

The rear end 3 has, like the front end 2, a shoulder with a sealing ring on which the rear end of the cylinder jacket is mounted and is secured by means of the axial screws 8. Also said rear end 3 is formed with a dampening chamber 15 matching a rear dampening piston 16 which is a fixed integral part of the piston 5. A valve is arranged in the rear end 3, which valve comprises a valve piston 18 which is actuated by a spring 17 and is arranged displaceable in a valve channel 19 between an upper position which is taken by the actuation of the spring 17 and a compressed, lower position which is taken when the valve channel 19 is placed under working pressure. From the valve channel 19 a horizontal channel 20 leads into the upper channel 9 of the cylinder jacket. Said channel is closed by a plug 21 some distance from the rear end of the channel, and in front of said plug 21 (as seen from the rear end) there is a cross bore 22 into the pressure chamber 23 between the piston 5 and the rear end 3.

An axial valve opening 24 extends from an intermediate position in the valve channel 19, and a channel 25 extends therefrom into the return air channel 10, whereby the return air chamber 26, over the channels 14, 10, 25, 24 is connected (drained) to the ambient when the valve piston 18 is in its compressed position counteracted by the pressure spring 17. The valve channel 19 is connected to a (not illustrated) compressed air valve which can be controlled by means of a suitable step motor, so that the pressure chamber alternatingly can be pressurized and pressure unloaded.

At the pressure unloading side the piston 5 is formed with a return air valve 6 comprising a valve rod 27 having a first axial pressure channel 28 extending through the rear dampening piston 16 and some distance into the valve rod 27, and a second pressure channel 29 extending from an axial intermediate position of the valve rod 27 and axially into a compressed air tank 30 in the inner of the piston rod 11, which is threaded to the front end 31 of the valve piston, and the unloading end thereof. A valve slide 32 is mounted axially slideable on the valve rod 27. The end of the valve slide 32 is formed to match the front dampening piston 13. The valve slide is displaceable a slight distance on the valve rod 27 counteracted by a pressure spring 33 which engages the piston 5 and which tends to press the valve slide 32 in the direction towards the front end 2. The movement forwardly is restricted by a shoulder 34 of the piston rod 11, against which shoulder the front dampening piston 13 is in contact when the valve slide is fully expelled by the operative piston 5. In the valve slide 32 there are two radial bores, a rear bore 35, which, at compressed valve slide, communicates with the rear pressure channel 28 and thereby with pressure chamber 23, and a front bore 36 which, likewise at compressed valve slide, communicates with the front pressure channel 29 and the compressed air chamber 30 of the piston rod 11. The bores 35 and 36 of the valve slide become opened in that the front dampening piston 13 is moved into the dampening chamber 12, whereby a collar 37 at the rear end of the dampening piston 13 comes into engagement with the rear end of the dampening chamber 12. Thereby the piston rod 11 with the valve rod 27 are being displaced an additional slight distance, and whereby the valve slide spring 33 is compressed, and the openings 35 and 36 of the slide are connected to the first 28 and the second 29, respectively, pressure channel of the valve rod 27.

For eliminating the risque that air from the unloading side is pressed back through the opening 35 and into the pressure chamber 23 after the pressure has ceased in the pressure chamber 23 and before the spring 33 has had time to expand thereby closing the return air valve 6 the opening 35 is formed with non-return valve, for instance in the form of an O-ring 38 engaging a seat at the exterior side of the valve slide 32. The O-ring 38 is arranged to open thereby letting compressed air into the return air chamber 26, and oppositely to prevent air from leaving said return air chamber 26.

The front dampening piston 13 is formed so as to match the size of the front dampening chamber 12 so that said piston 13, close to the end of the piston movement towards its front end position is moved into the front dampening chamber 12 thereby dampening the movement of the piston a short distance before reaching the end position thereof. Correspondingly the rear dampening piston 16 provides a soft braking of the return movement of the piston as said piston slides in the rear dampening chamber 15.

The function of the illustrated valve is the following:

A. Working phase

Figure 1:
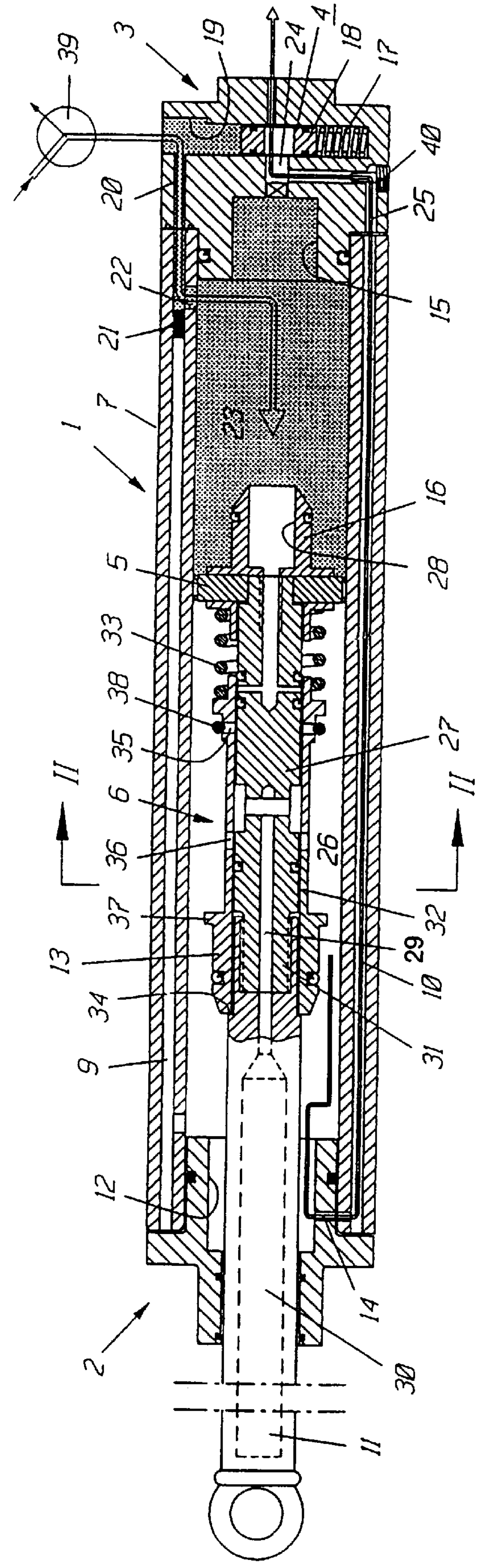
Figure 2:
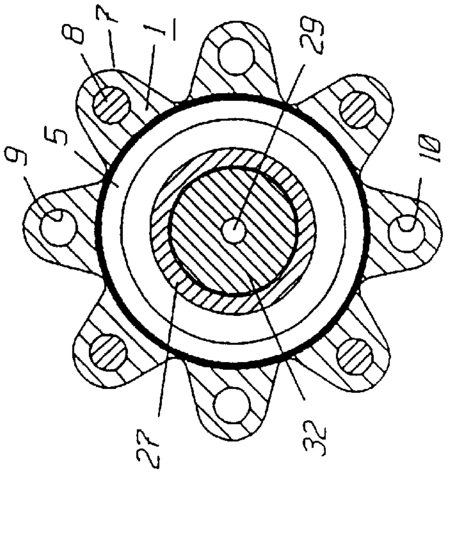
FIG. 2 is a transversal cross section through the apparatus of FIG. 1, as seen along line II—II.

An main valve 39, which may be an external main valve, or a valve included in the piston-cylinder apparatus, for executing the operation of the apparatus provides an intermittent pressurization and draining, respectively, of the pressure chamber 23. For executing the working stroke the valve 39 is set so that full pressure is introduced in the valve channel 19 at the rear end 3, into the open part of the upper channel 9, through the opening 22 and into the pressure chamber 23. This is marked in grey colour in FIG. 1. When the valve channel 19 is pressurized the valve piston 18 is pressed down and opens a communication between the valve opening 24 and the ambient air. The piston is displaced in the direction towards the front end 2. The air of the return chamber 26 is thereby forced out and is drained through the channel 14 at the front end 2, through the return air channel 10 of the cylinder jacket 1, through the channel 25 and the valve opening of the rear end 3 and out to the ambient. The piston 5 thereby operates without any counter pressure.

In some situations it may be desired to provide a slight counter pressure in the return air chamber 26, and to this end a choke valve 40 can be mounted at some place of the draining channels, for instance close to the valve opening 24, as shown in the drawings. By means of said choke valve 40 a counter pressure can be built up in a controlled manner.

B. The braking phase after the working phase

Figure 3:
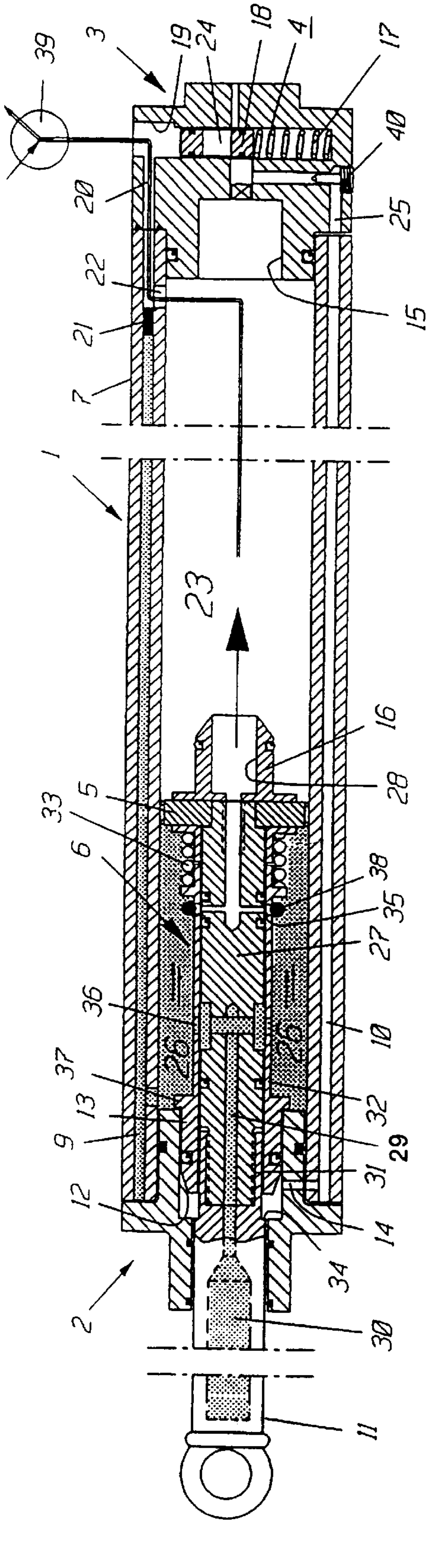
FIG. 3 shows the same piston-cylinder apparatus as that of FIG. 1 at the moment when the working stroke has just come to an end and the piston is about to start its return stroke.

In FIG. 3 is illustrated the braking and reversing moment of the piston-cylinder apparatus. When the piston 5 has come so far that the front dampening piston 13 begins moving into the dampening chamber 12 the movement of the valve slide 32 is being braked, whereas the piston rod 11 together with the valve rod 27 continues its movement a slight distance. The slide 32 is thereby displaced in relation to valve rod 27 while compressing the spring 33. At full displacement, which is the position when the collar 37 of the dampening piston 13 engages the inner end of the front end 2, the bores 35 and 36 of the valve slide 32 have created a communication with the pressure channels 28 and 29. Full pressure is thereby transferred from the pressure chamber 23, through the rear valve slide bore 35 to the return air chamber 26 and further to the compressed air chamber 9 in the upper channel of the cylinder jacket 1. Also, full pressure from the return air chamber 26 is introduced through the front valve slide bore 36 to the front compressed air channel 29 and to the piston rod tank 30. The slight amount of air which is remained in the dampening chamber 12 when the dampening piston is introduced is now drained through the channel 14 and the return air channel 10. The channel 14 can be with such small dimensions as to create a choking of the outflow of air.

C. Reversing phase

The piston now has performed a full working stroke and the main valve 39 is adjusted so that the piston chamber 23 is connected to the ambient air. Since the pressure has ceased in the valve channel 19 the valve spring 17 forces the valve piston 18 upwards in the rear end 3 thereby closing the valve opening 24 and thereby also closing the return air channel 10.

D. Return phase

There is a stored air pressure in the return air chamber 26 and in the compressed air tanks 9, 29, 30, marked in grey colour in FIG. 3 which forces the piston back to its initial position, which is shown in FIG. 4, and this is made without any supply of compressed air. As soon as the piston starts moving from the point of reverse at the front end 2 the valve slide 32 closes the valve bores 35 and 36 of the valve rod 27 in that the spring 33 forces the valve slide 32 back into engagement with the shoulder 34 of the piston rod 11. Close to the end of the return movement the piston movement is dampened in that the rear dampening piston 16 is pressed into the rear dampening chamber 15.

Thereby a complete operation cycle has come to an end, and the main valve 39 is readjusted to pressure setting, whereby a new cycle A-B-C-D is started, from the position shown in FIG. 4.

| REFERENCE NUMERALS | |
|---|---|
| 1 cylinder jacket | 21 plug |
| 2 front end | 22 cross opening |
| 3 rear end | 23 pressure chamber |
| 4 draining valve | 24 valve opening |
| 5 operative piston | 25 channel |
| 6 return air valve | 26 return air chamber |
| 7 arm | 27 valve rod |
| 8 mounting screw | 28 first pressure chamber |
| 9 compressed air chamber | 29 second pressure chamber |
| 10 return air channel | 30 piston rod tank |
| 11 piston rod | 31 threaded end |
| 12 front dampening chamber | 32 valve slide |
| 13 front dampening piston | 33 pressure spring |
| 14 channel | 34 shoulder |
| 15 rear dampening chamber | 35 rear bore |
| 16 rear dampening piston | 36 front bore |
| 17 spring | 37 collar |
| 18 valve piston | 38 O-ring |
| 19 valve channel | 39 main valve |
| 20 channel | 40 choke valve |

I claim:

1. Pneumatic piston-cylinder apparatus of single acting type which performs a working stroke in one working direction, and which is returned to its initial position without any external supply of compressed air, and comprising a cylinder part with a cylinder jacket (1), a front end (2) and a rear end (3), and a piston (5) which is reciprocatable in said cylinder, and further comprising means (39), connected only to the rear end (3) for supply of compressed air, and in which the cylinder (1, 2, 3) is formed with means (10, 25, 4) for draining the air from the unloading side (26) of the piston (5) during the working stroke of the piston, and means (9, 26, 29, 30) for building up a reserve amount of compressed air at the unloading side (26) of the piston (5) which reserve amount of compressed air is utilized for returning the piston to its initial position for the working stroke, characterized in that the means (9, 26, 29, 30) for building up a reserve amount of compressed air at the unloading side (26) of the piston (5) at the end of the working stroke comprises a valve rod (27) which is connected to the piston and which has a tubular valve slide (32) reciprocateable thereon, and whereby the valve slide (32) is normally kept in a position spaced from the piston (5) actuated by a spring (33), and in which the valve slide (32), close to the end of the working stroke of the piston, is forced in the direction towards the piston (5), whereby one or more channels (35, 36) are opened between the pressure chamber (23) of the apparatus and one or more draining tanks (9, 29, 30) in which tanks there is created a pressure which is used for returning the piston (5) to its initial position for the working stroke.

2. Piston-cylinder apparatus according to claim 1, characterized in that a supplementary compressed air tank (9) is provided in a channel of the cylinder jacket (1).

3. Piston-cylinder apparatus according to claim 1, characterized in that the means for draining the air at the unloading side of the piston comprises a draining channel (10, 25) which can be opened and closed, respectively, by means of an evacuation valve (4) the operation of which is controlled by the supply and the draining, respectively, of compressed air into/out of a working chamber (23) between the rear end (3) and the piston (5).

4. Piston-cylinder apparatus according to claim 3, characterized in that the valve rod (27) is formed with a first pressure channel (28) leading from the pressure chamber (23) of the apparatus to the return air chamber (26) over a valve bore (35) of the valve rod (27), and a second pressure channel (29) which, from a second valve bore (26) leads through the second pressure channel (29) of the valve rod (27) to a compressed air tank (30) provided internally in a piston rod (11), and which pressure is utilized for returning the piston to its initial position for the working stroke after the draining valve (4) at the rear end (3) has become closed and the valve slide (32) has been displaced to closed position on the valve rod (27).

5. Piston-cylinder apparatus according to claim 3, characterized in that the draining valve comprises a valve piston (18) which is arranged so at to be biased to closed position by a spring (17) and to opened position by the pressure of the working (23).

6. Piston-cylinder apparatus according to claim 1, characterized in that both the piston (5), at the rear side thereof, and the valve slide (32), at the front side thereof, are formed with a dampening piston (16, 13) for co-operation with a dampening chamber (15, 12) at the rear end (3) and at the front end (2), respectively.

* * * * *